United States Patent
Yu (10) Patent No.: US 9,268,387 B2
(45) Date of Patent: Feb. 23, 2016

(54) METHOD FOR SAVING POWER CONSUMPTION AND AN ELECTRONIC DEVICE THEREOF

(71) Applicant: Samsung Electronics Co., Ltd., Gyeonggi-do (KR)

(72) Inventor: Yong-Jun Yu, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 300 days.

(21) Appl. No.: 13/915,750

(22) Filed: Jun. 12, 2013

(65) Prior Publication Data

US 2013/0339772 A1     Dec. 19, 2013

(30) Foreign Application Priority Data

Jun. 13, 2012     (KR) .................. 10-2012-0063090

(51) Int. Cl.
*G06F 1/32* (2006.01)
*H04W 52/02* (2009.01)

(52) U.S. Cl.
CPC ............ *G06F 1/3212* (2013.01); *G06F 1/3206* (2013.01); *H04W 52/0245* (2013.01); *H04W 52/0261* (2013.01); *Y02B 60/50* (2013.01)

(58) Field of Classification Search
CPC .............. G06F 1/3212; G06F 1/3206; H04W 52/0245; H04W 52/0261
See application file for complete search history.

(56) References Cited

U.S. PATENT DOCUMENTS

| 6,366,792 | B1 | 4/2002 | Katsuki | |
|---|---|---|---|---|
| 7,398,110 | B2 * | 7/2008 | Schmerts | ...................... 455/566 |
| 8,385,986 | B2 | 2/2013 | Kim | |
| 2007/0063676 | A1 * | 3/2007 | Davani | .......................... 320/149 |
| 2008/0057894 | A1 * | 3/2008 | Aleksic et al. | ............. 455/187.1 |
| 2008/0113693 | A1 | 5/2008 | Yoo | |
| 2009/0164152 | A1 | 6/2009 | Creus et al. | |
| 2010/0317374 | A1 * | 12/2010 | Alpert et al. | ................... 455/458 |
| 2011/0080422 | A1 | 4/2011 | Lee et al. | |
| 2011/0109613 | A1 | 5/2011 | Asai et al. | |

FOREIGN PATENT DOCUMENTS

| CN | 101903845 | A | 12/2010 |
|---|---|---|---|
| EP | 2 288 040 | A1 | 2/2011 |
| EP | 2 309 363 | A1 | 4/2011 |
| GB | 2 337 423 | A | 11/1999 |
| KR | 10-2009-0054078 | A | 5/2009 |

* cited by examiner

*Primary Examiner* — Stefan Stoynov
(74) *Attorney, Agent, or Firm* — Cha & Reiter, LLC (57) ABSTRACT

An apparatus and method for signal saving power consumption in an electronic device includes determining a current battery consumption amount, and if the current battery consumption amount is greater than or equal to a threshold, determining whether to enter a low power mode based on the level of a signal strength level.

13 Claims, 5 Drawing Sheets

METHOD FOR SAVING POWER CONSUMPTION AND AN ELECTRONIC DEVICE THEREOF

CLAIM OF PRIORITY

This application claims the benefit under 35 U.S.C. §119(a) of an earlier Korean patent application filed in the Korean Intellectual Property Office on Jun. 13, 2012 and assigned Serial No. 10-2012-0063090, the entire disclosure of which is hereby incorporated by reference.

BACKGROUND

1. Strength of the Invention

The present disclosure relates to an apparatus and method for saving power consumption in an electronic device.

2. Description of the Related Art

Electronic devices have become necessities of modern life due to easiness of portability and facilitation of multimedia services such as audio and video telephony functions, information input and output functions, and data storage functions.

However, a battery capacity is limited in a portable device due to extended usage. In order to support various functions with a limited battery capacity, there is a need to consider not only ways to increase a battery capacity but also ways to save battery consumption.

In general, the electronic device enters a low power mode to save the battery consumption where low power is applied to a module, which consumes more power during operation.

For example, if an electronic device does not sense a user input during a specific time period, low power is applied to a backlight, a near strength communication module, or the like to conserve battery life. Also, if the electronic device is located in a weak signal strength region, it is determined that normal telephony is impossible and thus low power may be applied to the modem or the power supply may be stopped. In this case, the electronic device periodically checks a signal strength status to determine whether power should be applied to the modem. However, although the electronic device can save power consumption by entering a low power mode, but power may be consumed in the process of checking the signal strength status.

Accordingly, in order to solve the aforementioned problem, there is a need for an apparatus and method for recognizing a signal strength status while maintaining a power saving mode.

SUMMARY

An aspect of the present invention is to solve at least the above-mentioned problems and/or disadvantages and to provide at least the advantages described below.

Accordingly, an aspect of the present invention is to provide an apparatus and method for controlling an electronic device to enter a low power mode depending on a battery consumption amount and a signal strength level.

Another aspect of the present invention is to provide an apparatus and method for performing a process of determining an electric field status after identifying that a battery consumption amount is greater than or equal to a threshold level in an electronic device.

Another aspect of the present invention is to provide an apparatus and method for not performing a process of determining an electric field status when a battery consumption amount is less than a threshold level in an electronic device.

Another aspect of the present invention is to provide an apparatus and method for restricting an electronic device from entering a low power mode by determining a battery consumption amount even if located in a weak electric field region.

In accordance with one aspect of the present invention a method of saving power consumption in an electronic device includes determining a current battery consumption amount; and if the current battery consumption amount is greater than or equal to a predetermined threshold, determining whether to enter into a low power mode depending on a signal strength level detected thereon.

In accordance with another aspect of the present invention an apparatus for saving power consumption in an electronic device includes a memory; and a processor operatively coupled to the memory, the processor configured to: determine a current battery consumption amount; and determine whether to enter into a low power mode according to predetermined criteria when the current battery consumption amount is greater than or equal to a predetermined threshold.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION

Exemplary embodiments of the present invention will be described herein below with reference to the accompanying drawings. For the purposes of clarity and simplicity, well-known functions or constructions are not described in detail as they would obscure the invention in unnecessary detail.

The present invention described hereinafter relates to an apparatus and method for controlling a process of determining an electric field status depending on a battery consumption amount in an electronic device.

The electronic device performs a process of identifying an electric signal strength to determine whether to enter into a low power mode upon confirming of a battery consumption amount greater than or equal to a threshold according to an exemplary embodiment of the present invention. That is, the electronic device determines a weak electric field region (electric signal strength) according to a battery consumption amount whether to enter into a low power mode and thus prevents the unnecessary electric field status (electric signal strength) checking process.

The low power mode includes a mode for applying low power to a modem in an electronic device located in the weak electric field region. A high power mode is a mode for supplying power for a normal operation of the electronic device.

It should be noted that the teachings of the present invention may be applicable in a portable electronic device, and any duplex system such as a portable terminal, a mobile phone, a media player, a table computer, a handheld computer, or a Personal Digital Assistant (PDA). Further, the electronic device may be any portable electronic device having two or more of any of these devices.

Figure 1:
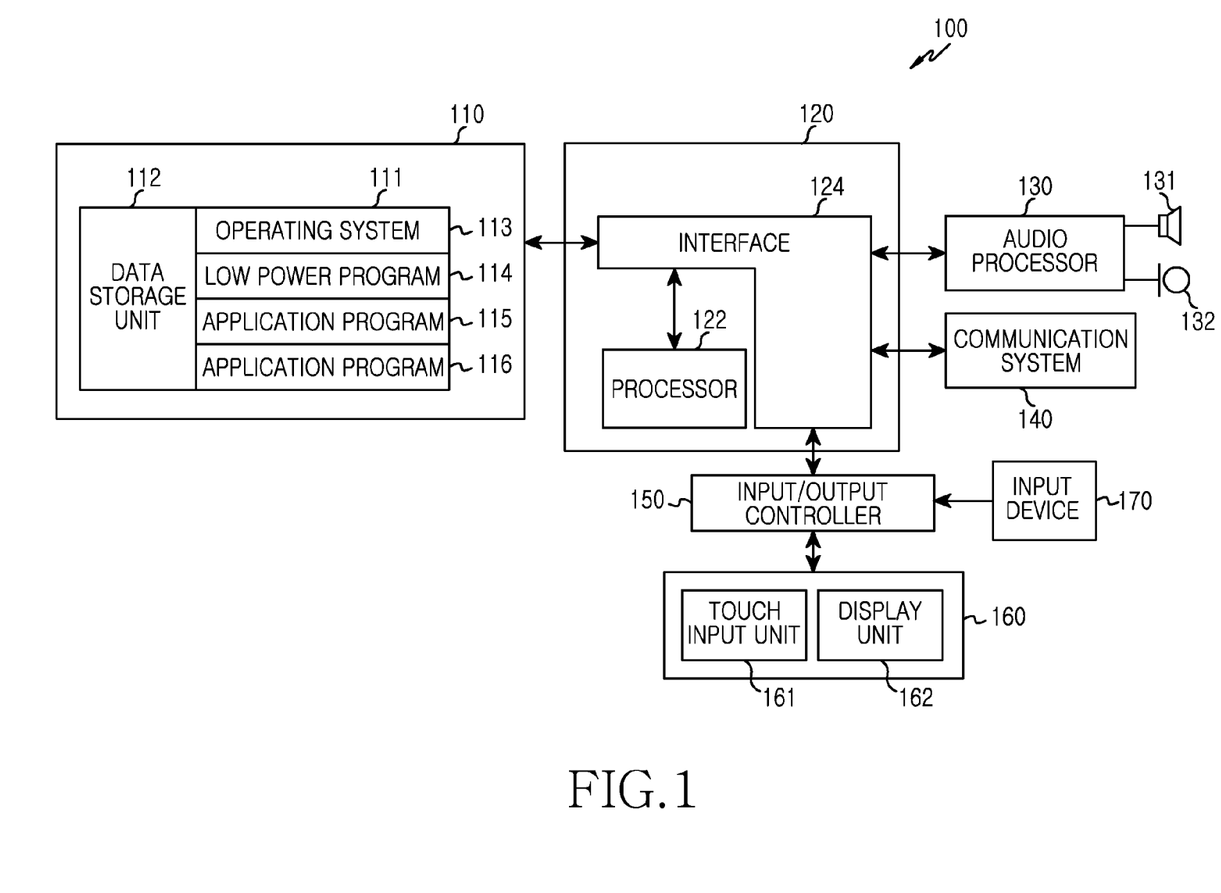
FIG. 1 is a block diagram illustrating a structure of an electronic device for saving power consumption according to an exemplary embodiment of the present invention.

FIG. 1 is a block diagram illustrating a structure of an electronic device according to an exemplary embodiment of the present invention.

Referring to FIG. 1, an electronic device 100 includes a memory 110, a processor unit 120, an audio processor 130, a communication system 140, an input/output controller 150, a touch screen 160, and an input device 170. Herein, the memory 110 and the communication system 140 may be plural in number.

The memory 110 includes a program storage unit 111 for storing a program for controlling an operation of the electronic device 100 and a data storage unit 112 for storing data generated while the program is executed. For example, the data storage unit 112 stores a variety of rewritable data, such as phonebook entries, outgoing messages, incoming messages, and reference information about a battery consumption amount used to determine a signal strength level or status of the electronic device 100. Herein, the reference information is a battery consumption amount measured on a pre-set time basis. In addition, the reference information provides a battery consumption amount for each allocation. Since consumed power may be known when executing each of the application, this is used to confirm the battery consumption amount. The power consumption for each application may be determined in a previous step of executing the application according to a known technology In addition, the program storage unit 111 includes an operating system 113, a low power program 114, an analysis program 115, and at least one application program 116. Herein, the program included in the program storage unit 111 is a group of instructions, and may be expressed as an instruction set.

The operating system program 113 includes various software components for controlling an operation of the general system. For example, the control of the general operation includes memory management and control, storage hardware (device) control and management, power control and management, etc. The operating system program 113 performs a function of facilitating communication between various hardware (devices) and program components (modules).

The low power program 114 includes at least one software component which allows the electronic device 100 to enter a low power mode to save battery consumption or to release the low power mode. That is, if a condition for entering the low power mode is satisfied, a low power is applied to the electronic device 100 by using the low power program 114.

In general, if the electronic device 100 is not used for a specific time period, a low power is applied to a backlight, a near field communication module, or the like which requires great power consumption by using the low power program 114. In addition, if the electronic device 100 is located in a weak signal strength region where transmission and reception is not feasible, the applying of power to the modem is stopped by using the low power program 114 to save battery consumption.

Alternatively, even when the electronic device 100 is located in the weak signal strength, the low power program 114 can apply power to the modem. That is, the low power program 114 may selectively activate the low power mode according to a user selection. The reason for this optional operation is that there is a situation in which a user must make a call even in the weak signal strength region where the quality of the call deteriorates.

The analysis program 115 determines whether to enter into a low power mode.

For example, the analysis program 115 determines the signal strength level of the electronic device 100, and if it is located in the weak signal strength region, then it determines to enter into the low power mode.

However, the analysis program 115 may determine the signal strength status of the electronic device 100 only when a battery consumption amount is greater than or equal to a threshold according to the exemplary embodiment of the present invention.

According to another exemplary embodiment of the present invention, the analysis program 115 confirms that the electronic device 100 is located in the weak signal strength region and thereafter, if the battery consumption amount is small, it may determine not to enter into the low power mode.

The application program 116 includes a software component for at least one application program installed in the electronic device 100.

The processor unit 120 includes at least one processor 122 and an interface 124. Note that the processor 122 and the interface 124 may be integrated as at least one integrated circuit or may be implemented as separate components.

The interface 124 serves to control an access to the processor 122 and the memory 110. In addition, the interface 124 takes a role of a peripheral device interface for controlling a connection of the processor 122 and an input/output peripheral device of the electronic device 100.

The processor 122 controls the electronic device 100 to provide a function of the low power mode by using at least one software program. In this case, the processor 122 executes at least one program stored in the memory 110 to enter the low power mode. For example, the processor 122 may include a pattern analysis processor and a low power processor. That is, the low power mode of the electronic device 100 may be performed in software such as a program stored in the memory 110 or in hardware such as the low power processor. The processor for controlling the entering the low power mode will be described in detail later with reference to FIG. 5.

The audio processor 130 provides an audio interface between the user and the electronic device 100 via a speaker 131 and a microphone 132.

The communication system 140 performs a communication function for voice and data communications of the electronic device 100. In this case, the communication system may be divided into a plurality of communication modules for supporting different communication networks. For example, although not limited thereto, the communication network includes a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Local Area Network (WLAN), a Bluetooth network, Near Field Communication (NFC), etc.

The input/output controller 150 provides an interface between an input/output device (e.g., the touch screen 160, the input unit 170, etc.) and an interface 124 of the memory 120.

The touch screen 160 is an input/output device for performing information input and output, and includes a touch input unit 161 and a display unit 162.

The touch input unit 161 provides touch information sensed via a touch panel to the processor unit 120 via the input/output controller 150. In this case, the touch input unit 161 provides the touch information to the processor unit 120 by changing the information in an instruction format such as touch_down (touch), touch_move (drag), and touch_up (release).

The display unit 162 displays status information of the electronic device 100, a character input by the user, a moving picture, a still picture, etc. For example, the display unit 162 can output a menu for selecting the entering of the low power mode according to the present invention.

The input unit 170 provides input data generated by a user selection to the processor unit 120 via the input/output controller 150. For one example, the input unit 170 includes only control buttons for the control of the electronic device 100. Alternatively, the input unit 170 may consist of a key pad for receiving data input from the user.

Although not shown, the electronic device 100 may further include components for providing an additional function such as a camera module for image or video capture, a broadcast receiving module for broadcast reception, a digital sound source reproducing module such as an MPEG-1 Audio Layer 3 (MP3) module, a near strength communication module for near strength communication, a proximity sensor for proximity sensing, etc., and a software element for operating the components.

The electronic device according to various embodiments of the present invention may include at least one processor, a memory, and at least one program stored in the memory and configured to be executed by the at least one processor.

Such a program may include an instruction for predicting the electric field status by using the battery consumption amount, and for allowing the electronic device to enter the low power mode if it is predicted that the electronic device is located in the weak electric field region.

In addition, the program may include an instruction for confirming the electric field status if the confirmed battery consumption amount is greater than or equal to the threshold, and for confirming the electric field status if the confirmed battery consumption amount is less than the threshold.

In addition, the program may include an instruction for confirming the battery consumption amount greater than or equal to the threshold by comparing a current battery consumption amount with a pre-set threshold, and may include an instruction for confirming the current battery consumption amount by using at least any one of a battery fuel gauge and a battery consumption amount for each application.

In addition, the program may include an instruction for outputting a menu for receiving a user selection before entering the low power mode, and for restricting the entering of the low power mode according to the user selection.

In addition, the electronic device according to various embodiments of the present invention may include at least one processor, a memory, and at least one program stored in the memory and configured to be executed by the at least one processor. The program may include an instruction for confirming whether to enter the low power mode by using a battery consumption amount and an electric field status, and may include an instruction for allowing an entering of the low power mode if battery consumption is great in a weak electric field status and allowing an entering of a high power mode if battery consumption is low in the weak electric field status.

In addition, the program may include an instruction for allowing to confirm the electric field status if the battery consumption amount is greater than or equal to a threshold.

In addition, the program may include an instruction for applying low power to a modem for a communication function for an electronic device located in the weak electric field region when entering the low power mode, and for applying normal power to a modem for a communication function of an electronic device located in the weak electric field region when entering the high power mode.

In addition, the program may include an instruction for displaying a menu for receiving an input of a user selection before entering the low power mode or the high power mode and for allowing an entering of a corresponding mode according to the user selection.

Figure 2:
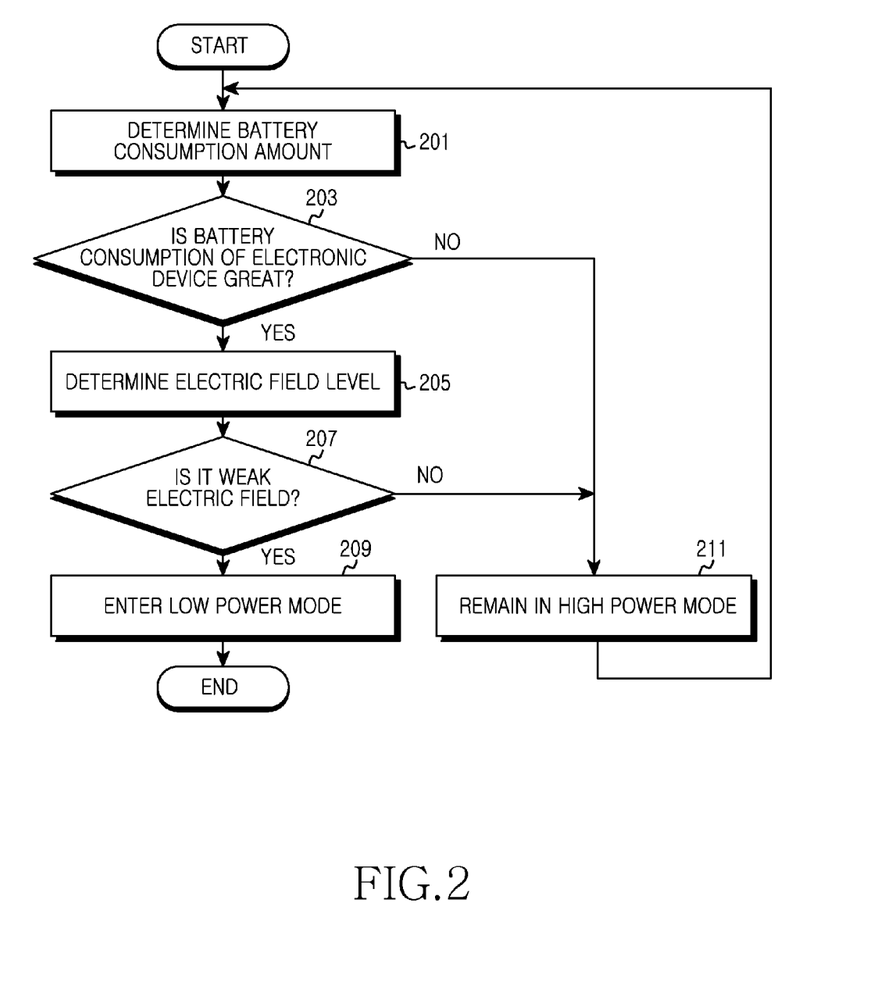
FIG. 2 is a flowchart illustrating a process of entering a low power mode in an electronic device according to an exemplary embodiment of the present invention.

FIG. 2 is a flowchart illustrating a process of entering into a low power mode in an electronic device according to an exemplary embodiment of the present invention.

Referring to FIG. 2, the electronic device determines a battery consumption amount in step 201, and determines whether a current battery consumption amount of the electronic device is greater than a preset threshold value, in step 203.

In this case, the electronic device can determine the current battery consumption amount using a battery fuel gauge. Alternatively, the electronic device may measure and store the battery consumption amount for each application using a known technology, and thereafter may determine the current battery consumption amount by confirming a feature of an application to be executed.

For example, the electronic device measures an electric-current consumption amount on a pre-set time basis, stores the measurement result in the memory, calculates an average battery consumption amount, and thus defines the calculation result as a threshold. In this case, the threshold may be updated (changed) on a different pre-set time basis.

If the current battery consumption amount is less than the threshold, in step 203, the electronic device remains in a high power mode in step 211 and thereafter repeats the process of step 201.

Meanwhile, if it is determined in step 203 that the battery consumption amount of the electronic device is greater or equal to the threshold value, the electronic device determines the signal strength level in step 205, and then confirms the status of the electronic device in step 207. In this case, the electronic device confirms whether the electronic device is located in a strong signal strength region or in a weak signal strength region by using any one of Chip Energy/Others Interference (EcIo), Received Signal Strength Indicator (RSSI), and Received Signal Code Power (RSCP).

If it is confirmed in step 207 that the electronic device is located in the strong signal strength region, proceeding to step 211, the electronic device performs a normal operation during which the high power mode is maintained.

Otherwise, if it is determined in step 207 that the electronic device is located in the weak signal strength region, proceeding to step 209, the electronic device is allowed to enter the low power mode.

In this case, the electronic device may apply a low power to the modem or may stop an operation of the communication module during a specific time period.

That is, the electronic device according to the present invention confirms a signal strength related parameter, i.e., RSCP/RSSI/EcIo, only when battery consumption is greater than a threshold level. In doing so, the battery consumption is saved in comparison with the conventional electronic device which periodically confirms or determines the signal strength level to determine whether to enter into a low power mode.

Thereafter, the procedure of FIG. 2 ends.

The electronic device according to the exemplary embodiment of the present invention may determine a current battery consumption amount during operation, and if the current battery consumption amount is greater than or equal to a threshold level, the terminal can selectively determine whether to enter into a low power mode Here, the electronic device can determine the current battery consumption amount by using at least any one of a battery fuel gauge and a battery consumption amount for each application In addition, the electronic device can output a menu for receiving a user selection before entering the low power mode, thus optionally restrict entering into the low power mode according to the user selection.

Figure 3:
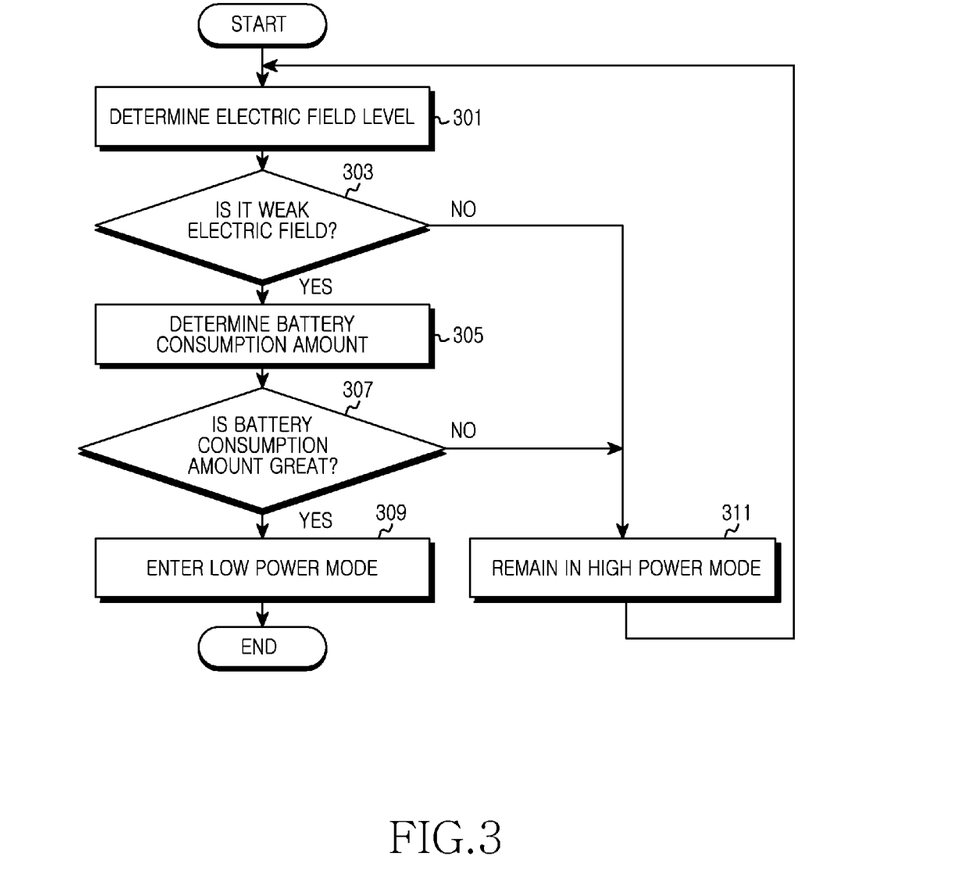
FIG. 3 is a flowchart illustrating a process of entering a low power mode in an electronic device according to another exemplary embodiment of the present invention.

FIG. 3 is a flowchart illustrating a process of entering into a low power mode in an electronic device according to another exemplary embodiment of the present invention.

Referring to FIG. 3, the electronic device determines an signal strength level based on any one of EcIo, RSSI, and RSCP in step 301, and confirms whether the electronic device is located in a strong signal strength region or in a weak signal strength region in step 303.

If it is confirmed in step 303 that the electronic device is located in the strong signal strength region, proceeding to step 311, the electronic device remains in a high power mode.

Meanwhile, if it is confirmed in step 303 that the electronic device is located in the weak signal strength region, the electronic device determines the battery consumption amount in step 305, and then confirms whether the battery consumption amount is greater than a threshold amount in step 307. In this case, as described above, the electronic device can compare a current battery consumption amount with a pre-set threshold.

If it is confirmed in step 307 that the battery consumption amount is smaller than the pre-set threshold, proceeding to step 311, the electronic device remains in the high power mode. A typical electronic device enters into a low power mode when it is located in the weak signal strength region. However, the electronic device according to the teachings of the present invention may not enter the low power mode if there is no or small amount of battery consumption by the electronic device when located in the weak signal strength region. The reason is that there is a situation in which a user must make a call connection even in the weak signal strength region. In this situation, the call can be made by applying a normal power level to the modem even if the call quality deteriorates. For example, if the user is located in a mountain area where there is a temporary weak signal strength region, it is desirable to allow an emergency call to be attempted even when the device is located in a weak signal strength area.

Meanwhile, if it is confirmed in step 307 that the battery consumption amount is greater than a threshold amount, proceeding to step 309, the electronic device can enter into a low power mode.

Thereafter, the procedure of FIG. 3 ends.

Figure 4:
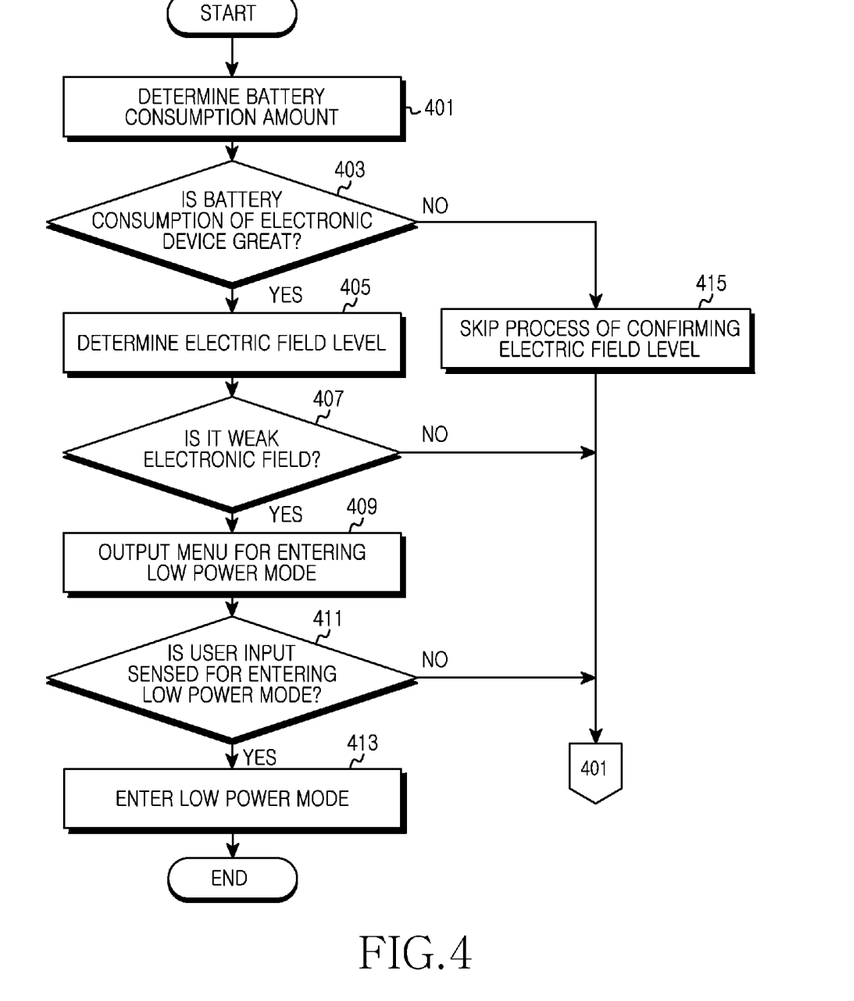
FIG. 4 is a flowchart illustrating a process of entering a low power mode in an electronic device according to another exemplary embodiment of the present invention.

FIG. 4 is a flowchart illustrating a process of entering a low power mode in an electronic device according to another exemplary embodiment of the present invention.

Referring to FIG. 4, the electronic device determines a battery consumption amount in step 401. To this end, the electronic device can compare a current battery consumption amount with a pre-set threshold. In this case, the electronic device can confirm the current battery consumption amount by using a battery fuel gauge, or by determining a feature of an application to be executed.

For example, the electronic device measures an signal-current consumption amount on a pre-set time basis, stores the measurement result to the memory, calculates an average battery consumption amount, and thus defines the calculation result as a threshold. In this case, the threshold may be changed on a different pre-set time basis.

In step 403, the electronic device performs a process of calculating a battery consumption amount of a current time and comparing the battery consumption amount with the threshold. If the battery consumption amount of the current time is greater than or equal to the threshold, it can be determined that the battery consumption amount of the electronic device is great.

If it is confirmed in step 403 that the battery consumption amount of the electronic device is less than the threshold, proceeding to step 415, the electronic device skips the process of determining the signal strength status, and thereafter repeats the process of step 401.

Otherwise, if it is confirmed in step 403 that the battery consumption amount of the electronic device is greater than or equal to the threshold, the electronic device performs a process of determining the signal strength level in step 405, and determines the signal strength level of the electronic device in step 407.

In this case, to confirm whether the electronic device is located in the strong signal strength region or in the weak signal strength region, the electronic device can use any one of EcIo, RSSI, and RSCP.

If it is confirmed in step 407 that the electronic device is located in the strong signal strength region, the electronic device performs the process of step 401. That is, in this case, the electronic devices do not enter the low power mode.

Otherwise, if it is determined in step 407 that the electronic device is located in the weak signal strength region, proceeding to step 409, the electronic device is allowed to output a menu for selecting the entering of the low power mode.

In step 411, the electronic device determines whether a user input is sensed for requesting an entering into a low power mode. That is, although the electronic device can enter the low power mode immediately when located in the weak signal strength region, the entering of the low power mode may be optionally controlled according to a user selection.

If it is confirmed in step 411 that the entering of the low power mode is selected by the user, proceeding to step 413, the electronic device is allowed to enter into the low power mode. In other words, the electronic device enters the low power mode only when the user selects the entering of the low power mode.

Otherwise, if it is confirmed in step 411 that the entering of the low power mode is not selected by the user; the electronic device performs the process of step 401.

Thereafter, the procedure of FIG. 4 ends.

Figure 5:
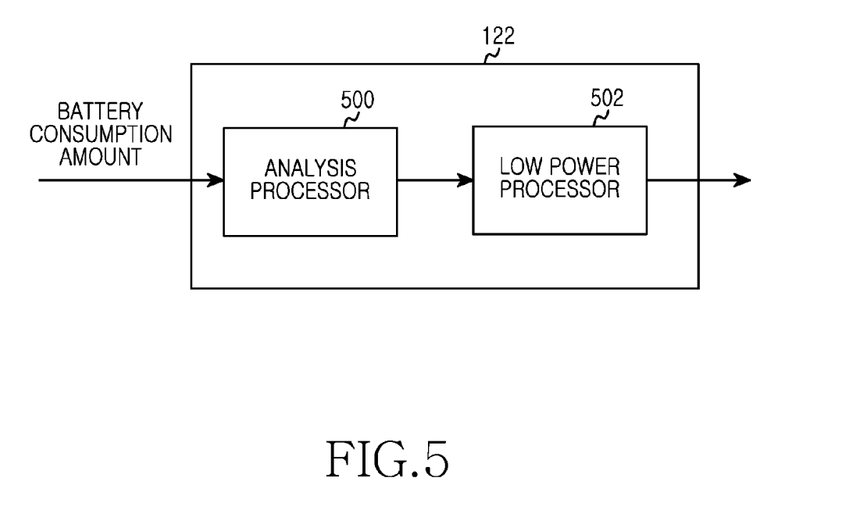
FIG. 5 is a block diagram of a processor according to an exemplary embodiment of the present invention.

It should be noted that the operations of FIG. 2 to FIG. 4 can be performed by the program stored in the memory of the electronic device or can be performed by a processor of FIG. 5.

FIG. 5 is a block diagram of a processor according to an exemplary embodiment of the present invention.

Referring to FIG. 5, the processor 122 includes an analysis processor 500 and a low power processor 502.

The analysis processor 500 executes the analysis program 115 of the program storage unit 111 to determine when to enter into a low power mode.

For example, the analysis processor 500 determines the signal strength level of the electronic device, and if it is located in a weak signal strength region as a confirmation result, determines to enter into the low power mode.

However, the analysis processor 500 can determine the signal strength status of the electronic device only when the battery consumption amount greater than or equal to a threshold according to the exemplary embodiment of the present invention.

According to another exemplary embodiment of the present invention, the analysis processor 500 confirms that the electronic device is located in the weak signal strength region and thereafter, if the battery consumption amount is smaller than a threshold amount, determines not to enter into the low power mode.

The low power processor 502 executes the low power program 114 of the program storage unit 111 to allow the electronic device to enter into the low power mode to save battery consumption or to release the low power mode.

That is, if a condition for entering the low power mode is satisfied, a low power is applied to the electronic device 100 by using the low power processor 502. In general, if the electronic device is not used for a specific time period, a low power is applied to a backlight which requires greater power consumption by using the low power processor 502. In addition, if the electronic device is located in the weak signal strength region, the power applied to the modem is stopped by using the low power processor 502 to save battery consumption.

In addition, if the electronic device is located in the weak signal strength region, the low power processor 502 can apply power to the modem according to the battery consumption amount and based on a user preference.

In summary, the processor 122 according to the present invention operates differently from the conventional processor for periodically determining a signal strength status in a sense that the signal strength level is determined when the battery consumption amount is greater than a predefined threshold amount. Accordingly, the number of steps of a process for determining the signal strength level is decreased, thereby saving power consumption.

In addition, the processor 122 can be optionally allowed to remain in a high power mode even in a weak signal strength area.

It should be apparent to those skilled in the art that the present invention described above provides a new scheme for saving battery consumption of an electronic device. Since a movement to a weak signal strength region can be predicted by using a battery consumption amount, the number of steps of a process for recognizing a signal strength level is decreased, thereby increasing a battery usage time.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method in an electronic device, comprising:
determining a current battery consumption amount;
measuring a signal strength of the electronic device only if the current battery consumption amount is greater than or equal to a predetermined threshold; and
determining whether to enter into a low power mode depending on the current battery consumption and the signal strength level of the electronic device.

2. The method of claim 1, wherein the step of determining whether to enter into the low power mode comprises:
entering into the low power mode if the electronic device is positioned within a weak signal strength region and the current battery consumption amount is greater than or equal to the predetermined threshold.

3. The method of claim 1, wherein the step of determining whether to enter into the low power mode comprises:
restricting entering into the low power mode if the electronic device is positioned within a weak signal strength region and the battery consumption amount is less than the predetermined threshold.

4. The method of claim 1, wherein the current battery consumption amount is determined from using at least one of a battery fuel gauge for a battery and a battery consumption level for each application.

5. The method of claim 1, further comprising:
displaying a menu for receiving a user selection before entering into the low power mode.

6. The method of claim 5, further comprising:
restricting entering into the low power mode according to the user selection.

7. An electronic device, comprising:
a memory; and
a processor operatively coupled to the memory, the processor configured to:
determine a current battery consumption amount;
measure a signal strength of the electronic device only if the current battery consumption amount is greater than or equal to a predetermined threshold; and
determine whether to enter into a low power mode depending on the current battery consumption amount and the signal strength level of the electronic device.

8. The device of claim 7, wherein the processor further configured to:
enter into the low power mode if the electronic device is positioned within a weak signal strength region and the current battery consumption amount is greater than or equal to the predetermined threshold.

9. The device of claim 7, wherein the processor further configured to:
restrict entering into the low power mode if the electronic device is positioned within a weak signal strength region and the battery consumption amount is less than the predetermined threshold.

10. The device of claim 7, wherein the current battery consumption amount is determined from using at least one of a battery fuel gauge for a battery and a battery consumption level for each application.

11. The device of claim 7, wherein the processor further configured to:
- display a menu for receiving a user selection before entering into the low power mode.

12. The device of claim 11, wherein the processor further configured to:
- restrict entering into the low power mode according to the user selection.

13. A non-transitory computer-readable storage medium storing one or more programs comprising instructions which, when executed by an electronic device, cause the device to execute the method according to claim 1.

* * * * *

UNITED STATES PATENT AND TRADEMARK OFFICE
CERTIFICATE OF CORRECTION

PATENT NO.         : 9,268,387 B2
APPLICATION NO.    : 13/915750
DATED              : February 23, 2016
INVENTOR(S)        : Yong-Jun Yu

It is certified that error appears in the above-identified patent and that said Letters Patent is hereby corrected as shown below:

Claims

Column 10, Claim 1, Lines 17-18 should read as follows:
--...consumption amount and a signal...--

Column 10, Claim 7, Lines 50-51 should read as follows:
--...amount and a signal...--

Signed and Sealed this
Third Day of May, 2016

Michelle K. Lee
*Director of the United States Patent and Trademark Office*